United States Patent [19]
Tan

[11] Patent Number: 5,973,939
[45] Date of Patent: *Oct. 26, 1999

[54] DOUBLE FORWARD CONVERTER WITH SOFT-PWM SWITCHING

[75] Inventor: F. Dong Tan, Irvine, Calif.

[73] Assignee: TRW Inc., Redondo Beach, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/705,577

[22] Filed: Aug. 29, 1996

[51] Int. Cl.$^6$ .......................... H02M 3/335; H02M 3/24; H02M 7/537

[52] U.S. Cl. ................................ 363/21; 363/97; 363/131

[58] Field of Search .................................. 363/16, 21, 20, 363/97, 89, 131; 323/224, 282

[56] References Cited

U.S. PATENT DOCUMENTS

| | | | |
|---|---|---|---|
| 4,441,146 | 4/1984 | Vinciarelli | 363/20 |
| 4,809,148 | 2/1989 | Barn | 363/20 |
| 4,959,764 | 9/1990 | Bassett | 363/16 |
| 5,066,900 | 11/1991 | Bassett | 323/224 |
| 5,126,931 | 6/1992 | Jitaru | 363/21 |
| 5,231,563 | 7/1993 | Jitaru | 363/98 |
| 5,325,283 | 6/1994 | Farrigton et al. | 363/21 |
| 5,363,289 | 11/1994 | Jacobs | 363/56 |
| 5,434,768 | 7/1995 | Jitaru et al. | 363/21 |

OTHER PUBLICATIONS

J.A. Bassett, *Constant Frequency ZVS Converter with Integrated Magnetics*, publication No. 0–7803–0485–3/92, *IEEE* 1992, pp. 709–716.

Bruce Carsten, *Design Techniques for Transformer Active Reset Circuits at High Frequencies and Power Levels*, *HFPC–May 1990 Proceedings*, pp. 235–245.

Koosuke Harada and Hiroshi Sakamoto, *Switched Snubber for High Frequency Switching*, publication No. CH2873–8/90/0000–0181 *1990 IEEE*, pp. 181–188.

Ionel Dan Jitaru, *High Frequency, Soft Transitions Converter*, publication No. 0–7803–0982–0/93, *1993 IEEE*, pp. 880–887.

*Primary Examiner*—Peter S. Wong
*Assistant Examiner*—Rajnikant B. Patel
*Attorney, Agent, or Firm*—Michael S. Yatsko

[57] ABSTRACT

A double forward DC-to-DC converter with soft-PWM switching provides two voltage pulses to the output low-pass filter within one switching cycle (hence, the name double forward). The double forward DC to DC converter includes a transformer having a single primary winding and a two secondary windings. A main switch, under the control of a PWM control circuit, is connected is series with the primary winding. An auxiliary switch is coupled across with the main switch by way of a resonant capacitor. The resonant capacitor and auxiliary switch are used to automatically reset the transformer core while the main switch is on back to the voltage source connected to the transformer primary. A diode and snubber capacitor is connected across the drain-source terminals for both the main and auxiliary switches for minimizing switching losses. The current mirror used in prior art is abandoned in order to avoid the locked-up mode of operation.

The secondary windings of the transformer are connected to a pair of saturable reactors which, in turn, are connected to rectifier diodes in order to eliminate the reverse recovery losses of the rectifier diodes. A freewheeling diode is connected across the secondary winding and cooperates with the saturable reactors to maintain the load current to the secondary windings during the transitions of the main and auxiliary switches.

19 Claims, 7 Drawing Sheets

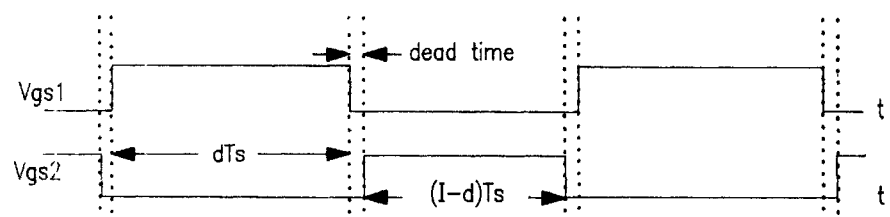

DOUBLE FORWARD CONVERTER WITH SOFT-PWM SWITCHING

BACKGROUND OF THE INVENTION

1. Field of the Invention

The present invention relates to a DC-to-DC converter circuit, and more particularly to a double forward DC-to-DC converter circuit with soft-PWM switching which includes a main switch, an auxiliary switch, rectifier diodes and a transformer for transferring energy from a primary winding of the transformer to a secondary winding when the main switch is under the control of a PWM circuit. The DC-to-DC converter circuit includes circuitry for automatically resetting the energy stored in the transformer winding when the main switch is turned off, without the possibility of being locked up as well as circuitry for soft switching of the rectifier diodes to eliminate reverse recovery losses associated with the rectifier diodes connected to the transformer secondary winding. The main and auxiliary switches are both turned on at zero voltage while snubber capacitors are provided to minimize turn-off losses.

2. Description of the Prior Art

DC-to-DC converters are used to convert an unregulated source of DC power into a source of constant voltage for use in various applications. Such DC converters normally include a transformer having primary and secondary windings. A switch, for example, a solid state switch, is connected to the primary winding in order to control energy transfer from the primary to secondary winding. In PWM-controlled converters, the switch is normally under the control of a pulse width modulator (PWM) circuit which varies the duty cycle, defined as switch on time over switching period.

With the increase of switching frequency to reduce the size and weight, as constantly required in aerospace and military applications, the switching losses increase rapidly. To cope with this, DC-to-DC power converter designers employ various schemes to eliminate or to minimize losses associated with switching of the solid state switches. These schemes are generally referred to as various techniques of soft switching. Among all kinds of soft switching schemes, the most promising ones are those which have zero-current or zero voltage switching at turn on and turn-off transitions, while keeping voltage and current stresses similar those in a PWM (hard-switched) converter. This is so because stress levels for switch voltage and current similar to those in a PWM (hard-switched) converters represent the best possible efficiency in power transfer. This group of soft switching can be called soft-PWM switching.

In recent developments the popular phase-shift scheme for soft switching comes close to realize soft-PWM waveforms. However, its applications are limited to double-ended converters, such as half-bridge and full-bridge converters. Most recent developments of soft switching schemes for single-ended converters, such as forward and flyback, utilize a mechanism known as the current mirror to reset the transformer automatically. Examples of such circuitry are disclosed in U.S. Pat. Nos.: 4,441,146; 4,809,148; 4,959,764 and 5,126,931. Examples of such circuitry is also disclosed in the following publications: *Constant Frequency ZVS Converter with Integrated Magnetics*, by J. A. Bassett, publication no. 0-7803-0485-3/92, 1992, IEEE, pp. 709–716; *High Frequency, Soft Transitions Converter*, by I. D. Jitaru, IEEE publications no. 0-7803-0982-0/93, 1993, IEEE, pp. 880–887; *Switched Snubber for High Frequency Switching*, by K. Harada and H. Sakamoto, IEEE publication no. CH2873-8/90/00000181, 1990, IEEE, pp. 181–187 and *Design Techniques for Transformer Active Resets Circuits at High Frequencies and Power Levels*, by B. Carsten, HFPC May 1990 proceedings, pp. 235–245. Such circuits typically include a second solid state switch and a capacitor for transferring the magnetizing current stored in the transformer winding when the main solid state switch is opened, recycling energy back to the DC voltage source connected to the transformer primary winding. Such circuitry causes the main and auxiliary switches to be turned on at zero voltage and includes a lossless snubber, normally a capacitor connected in parallel across the switch. The snubber is used to minimize the voltage stress and losses when the switch is turned off. In addition, such circuits are configured to discharge the snubber capacitor prior to closing of the switch to eliminate the turn on loss and to minimize the voltage stress across the switch when the switch is turned on. Examples of such circuitry are disclosed in U.S. Pat. Nos. 4,959,764, 5,126,931 and 5,231,563.

Note that the technique of the current mirror, used in the cited patents, may cause the circuit to operate in a mode locked-up to a subharmonic frequency. The locked-up mode of operation forces the output voltage to go out of regulation and may potentially damage the switching elements. An additional protection circuit is used to guarantee safe operation of the converter.

As disclosed in U.S. Pat. Nos: 4,809,148; 4,441,146; 4,959,764 and 5,126,931, DC-to-DC converters normally include one or more rectifier diodes, connected to the transformer secondary winding. Typically one rectifier diode is connected in parallel across the secondary winding of the transformer while a second rectifier diode is connected in series with the load. In any switching converters, the rectifier diodes are subject to what is known as reverse recovery losses which result when the biasing across the diode quickly reverses. Various techniques are known for minimizing the reverse recovery losses of the rectifier diodes, for example, as disclosed in *High Frequency, Soft Transitions Converter*, by I. D. Jitaru, publication no. 0-7803-0982-0/93, 1993 IEEE, pp. 880–887 (and in U.S. Pat. No. 5,434,768). However, the technology, as the author stated, "does not eliminate totally the reverse recovery loss of the diodes."

In short, existing converters circuits, while implementing effectively soft switching, suffer from two major defects: the dangerous locked-up mode, which may destroy parts, and the excessive reverse recovery losses of diodes, which compromises power conversion efficiency.

SUMMARY OF THE INVENTION

It is an object of the present invention to provide a DC-to-DC converter circuit which solves these problems associated with the prior art.

It yet another object of the present invention to provide a DC-to-DC converter circuit which eliminates reverse recovery losses of rectifier diodes.

It is yet an another object of the present invention to provide a DC-to-DC converter circuit which includes a transformer, a main switch and circuitry for automatically transferring the energy stored in the transformer winding back to the voltage source connected to the primary of the transformer when the main switch is off.

It is yet another object of the present invention to provide a DC-to-DC converter system with soft-PWM switching which includes a main switch and an auxiliary switch with lossless snubbers for minimizing the switching losses of the solid state switches.

Briefly, the present invention relates to a new forward DC-to-DC converter with soft-PWM switching. The converter presents two pulses to the output low-pass filter within one switching cycle. Hence, power is forwarded to the output twice (double forward) in one switching cycle of the converter. The double forward DC-to-DC converter includes a transformer having a single primary winding and two secondary windings. A main switch, under the control of a PWM control circuit, is connected in series with the primary winding. An auxiliary switch is coupled across with the main switch by way of a resonant capacitor. The resonant capacitor and auxiliary switch are used to automatically transfer energy stored in the transformer winding, while the main switch is off, back to the voltage source connected to the transformer primary. A diode and snubber capacitor is connected across the drain-source terminals for both the main and auxiliary switches for minimizing switching losses. The so-called current mirror is abandoned here by intelligent design of circuit. Hence, the notorious locked-up mode of operation is avoided.

The secondary windings of the transformer are connected to a pair of saturable reactors which, in turn, are connected to rectifier diodes. A freewheeling diode is connected across the secondary winding and cooperates with the saturable reactors to limit the load current to the secondary of the converter during the transitions of the main and auxiliary switches. This configuration provides the needed mechanism to eliminate the reverse recovery losses of the rectifier diodes.

DESCRIPTION OF THE DRAWINGS

These and other objects of the present invention will be readily understood with reference to the following specification and attached drawing wherein:

FIGS. 2A–2M represent the key waveforms of the voltage and current as a function of time of various circuit elements in the DC-to-DC converter circuit illustrated in FIG. 1.

A DETAILED DESCRIPTION OF THE INVENTION

Two important considerations in all types of power conversion are efficiency and power density. DC-to-DC converter circuits with soft switching are known to provide relatively better results than conventional PWM switching power supplies. The double forward DC-to-DC converter with soft-PWM switching in accordance with the present invention includes circuitry to minimize switching losses of the switching devices and also eliminates reverse recovery losses associated with the rectifier diodes. An important feature in the double forward DC-to-DC converter circuit in accordance with the present invention is that switching and reverse recovery losses are eliminated with minimal circuit complexity and minimum introduction of losses due to the additional circuitry.

Figure 1:
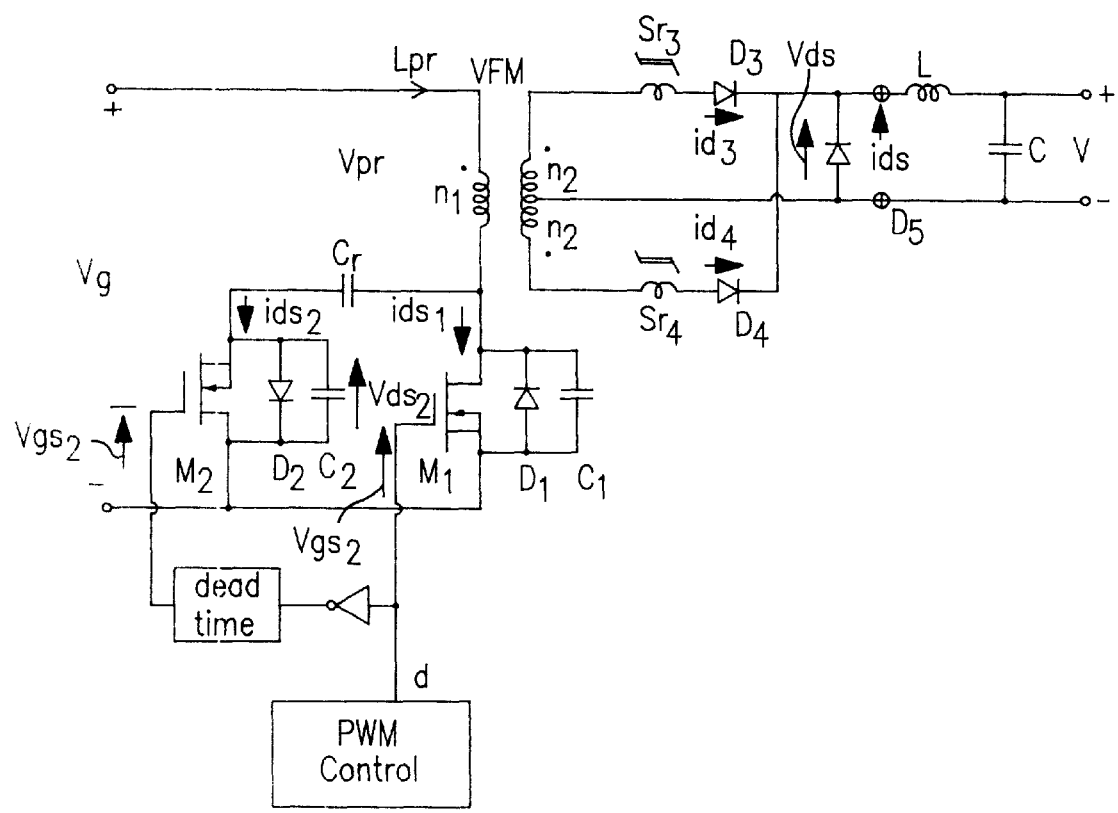
FIG. 1 is schematic diagram of a double forward DC-to-DC converter circuit with soft-PWM switching in accordance with the present invention.

The double forward DC-to-DC converter circuit in accordance with the present invention is illustrated in FIG. 1 and generally identified with the reference numeral 20. The forward DC-to-DC converter circuit 20 includes a transformer XFRM having a single primary winding with $n_1$ turns and dual secondary windings each with equal turns, $n_2$. The polarities of the primary and secondary windings are as indicated by the dots in FIG.1. $M_1$, for example, a solid state switch, such as a MOSFET with gate, drain and source terminals, is used to control the energy flow in the primary winding. In particular, the drain and source terminals of the main switch $M_1$ are connected in series with the primary winding. A pair of input terminals is connected to the primary winding and the main switch $M_1$. A source of DC voltage is coupled to the input terminals.

An auxiliary switch $M_2$, for example, solid state switch, such as a MOSFET with gate, drain and source terminals, is connected with its drain and source terminals electrically coupled across the drain and source terminals of the main switch $M_1$. The auxiliary switch $M_2$ in combination with a resonant capacitor $C_R$ is used for resetting the transformer core and for enabling zero-voltage switching for both the main switch $M_1$ and the auxiliary switch $M_2$. The resonant capacitor $C_R$ is connected between the two switches $M_1$ and $M_2$ as shown. The gate terminals for both the main switch $M_1$ and auxiliary switch $M_2$ are connected to control logic such that both switches $M_1$ and $M_2$ are operated in a complementary manner wherein both switches are not on at the same time. Also the control circuitry is such that a predetermined dead time is provided after the main switch $M_1$ is turned off and before the auxiliary switch $M_2$ is turned on. A dead time is also provided from the time the auxiliary switch $M_2$ is turned off before the main switch $M_1$ is turned back on. The dead times are discussed in more detail below.

Lossless snubbers $C_1$ and $C_2$ are connected in parallel across the drain and source terminals of the main switch $M_1$ and auxiliary switch $M_2$, respectively. These lossless snubbers $C_1$ and $C_2$, as will be discussed in more detail below, reduce the turn off losses of the main switch $M_1$ and the auxiliary switch $M_2$ by limiting the voltage across the switches $M_2$ and $M_2$ to the voltage $V_{CR}$ across the resonant capacitor $C_R$. The snubbers $C_1$ and $C_2$ may be implemented as discrete capacitors, the stray capacitances associated with the switches $M_1$ and $M_2$ or a combination of both.

Diodes $D_1$ and $D_2$ are connected across the drain and source terminals of the switches $M_1$ and $M_2$ respectively. As will be discussed in more detail below, the diodes $D_1$ and $D_2$ are used, together with the resonant capacitor $C_R$ and the magnetizing inductance of transformer XFRM, to minimize turn-on losses of the switches $M_1$ and $M_2$. If the switches $M_1$ and $M_2$ are implemented as MOSFETS, the body diodes of MOSFETS may be used for the diodes $D_1$ and $D_2$. Alternatively, discrete diodes for $D_1$ and $D_2$ can also be used.

A resonant capacitor $C_R$ is connected between the respective drain or source terminals of the main $M_1$ and auxiliary $M_2$ switches. The resonant capacitor $C_R$ in combination with the magnetizing inductance, and the switches $M_1$ and $M_2$ automatically transfer the energy stored in the transformer winding back to the DC voltage source connected to the transformer primary winding when the main switch $M_1$ is turned off as well as enable zero-voltage turn-on of the switches $M_1$ and $M_2$. In particular, once the main switch $M_1$ is turned off, the energy stored in the transformer core charges the resonant capacitor $C_R$, forward biasing the diode $D_2$ across the auxiliary switch $M_2$ to enable the auxiliary switch $M_2$ to turn on while the diode $D_2$ is conducting, which, in turn, enables the auxiliary switch $M_2$ to be turned on at zero voltage. Once the auxiliary switch $M_2$ is turned on, the energy stored in the transformer winding is automatically returned to a source of DC voltage connected to the primary winding of the transformer XFRM. The resonant capacitor $C_R$ also forward biases the diode $D_1$ to enable turn on of the main switch $M_1$ while the diode $D_1$ is conducting thereby allowing the main switch $M_1$ to be turned on at zero volts. As will be discussed in more detail below, the turn-off voltage stress across the main $M_1$ and auxiliary $M_2$ switches is limited to the voltage $V_{CR}$ across the resonant capacitor $C_R$. $V_{CR}$ equals 1.5 $V_g$ typically.

As mentioned above, the transformer XFRM includes dual secondary windings each having an equal number of turns, $n_2$. A pair of rectifier diodes $D_3$ and $D_4$ are connected in series with the secondary windings. In order to eliminate reverse recovery losses of the rectifier diodes, $D_3$ and $D_4$, a pair of saturable reactors $SR_3$ and $SR_4$ are utilized. In particular, one saturable reactor $SR_3$ ($SR_4$) is connected in series with each of the rectifier diodes $D_3$ ($D_4$). A freewheeling diode $D_5$ is connected across the input of the low-pass filter. The freewheeling diode $D_5$ in combination with the saturable reactors $SR_3$ and $SR_4$ keeps the load current flowing to the secondary during the transition time of the main switch $M_1$ and auxiliary switch $M_2$.

Output terminals are defined across the freewheeling diode D5. A filter consisting of an inductor and a capacitor C may be connected across the output terminals.

In order to best understand the operation of the double forward DC-to-DC converter circuit 20 in accordance with the present invention, reference is made to FIGS. 3A–3E which show the four stages of operation of the circuit: forward mode, (FIG. 3A), linear soft transition mode (FIG. 3B), "flyback"/forward mode (FIGS. 3C/3D), and resonant soft transition mode (FIG. 3E) while FIGS. 2A–2M illustrate idealized wave forms of voltages and currents for various components in the circuit.

Figure 3A:
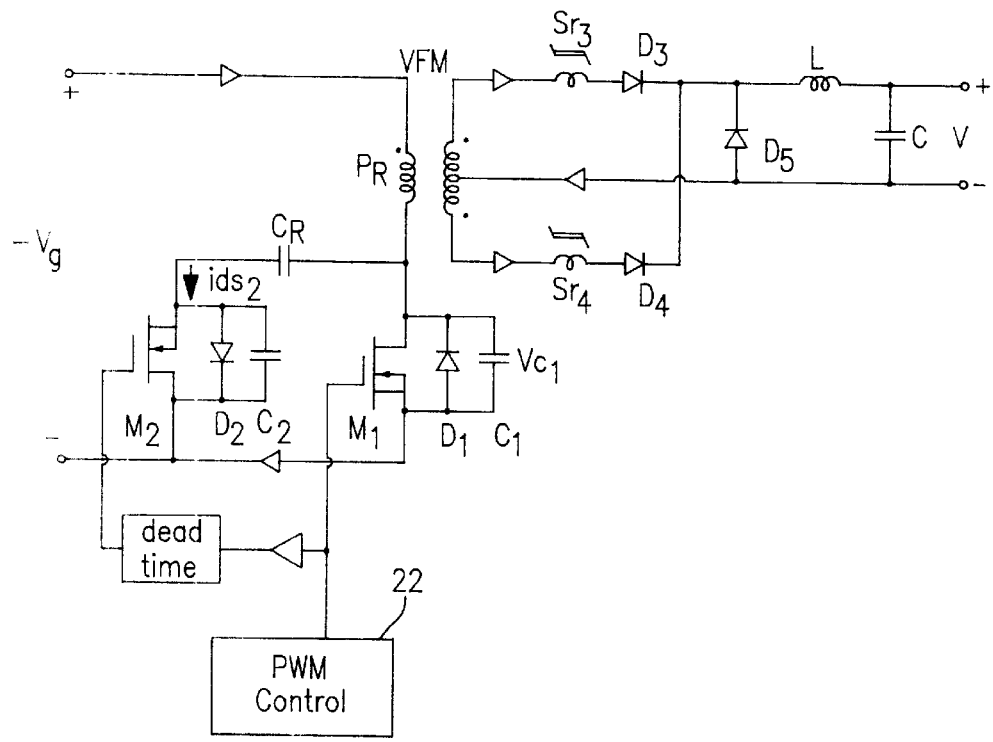
FIGS. 3A–3E represent the major stages of operation of the double forward DC-to-DC converter circuit in accordance with the present invention, illustrating the direction of current flow during each stage as indicated by dark line.

Referring first to FIG. 3A, a forward mode of operation of the converters is illustrated. In this mode, the main switch $M_1$ is turned on by way of a PWM control circuit 22, while the diode $D_1$ is conducting, as will be discussed in more detail below. Such PWM controls circuits are known in the art and commonly available. For example, a PWM integrated circuit, model no. SG1843 as manufactured by Silicon General is suitable for such an application.

Once the main switch $M_1$ is turned on, electrical current flows from the positive rail of the DC voltage source through the primary winding of the transformer XFRM, the drain and source terminals of the main switch $M_1$ and back to the negative rail of the DC voltage source. As will be discussed in more detail below, the main switch $M_1$ is turned on while the diode $D_1$ is conducting resulting in essentially a zero-voltage turn-on for the main switch $M_1$ as shown in FIG. 2I, thus minimizing, if not eliminating, switching losses associated with the turning-on of the main switch of $M_1$. After the main switch $M_1$ is turned on, the electrical current through the primary winding of the transformer XFRM linearly ramps up as a function of the magnetizing inductance of $L_m$ of the transformer winding and the input DC voltage $V_g$.

During this mode, energy is transferred from the primary winding to the secondary winding and, in turn, to the load connected across the capacitor C. This mode of operation is identical to that of a forward converter. During the forward mode, the saturable reactor $SR_3$ is saturated and thus turned on allowing current to flow through the diode $D_3$, the inductor L, the load and return to the secondary winding of the transformer XFRM. During this condition, the saturable reactor $SR_4$ is blocking.

Figure 3B:
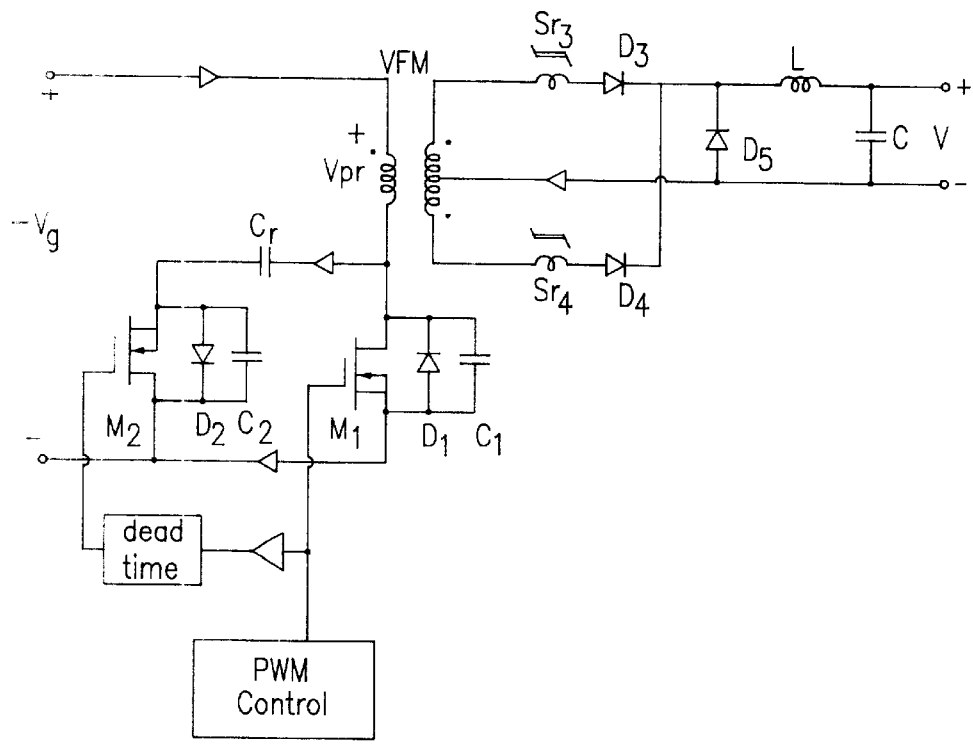

Immediately after the main switch $M_1$ is turned off, as illustrated in FIG. 3B, the circuitry enters a soft transition mode. In this mode the saturable reactors $SR_3$ and $SR_4$ as well as the freewheeling diode allow for soft switching of the rectifier diode $D_3$. In particular, immediately after the main switch $M_1$ is turned off (during the dead time before the auxiliary switch $M_2$ is turned on) the voltage $V_{pr}$ across the primary winding transitions from a positive value to a negative value, as illustrated in FIG. 2C. During this period the electrical current $I_{pr}$ through the primary winding of the transformer XFRM is positive as illustrated in FIG. 2C. This electrical current $I_{pr}$ through the primary winding charges the resonant capacitor $C_R$, which, in turn, forward biases the diode $D_2$ connected across the auxiliary switch $M_2$ which allows the electrical current $I_{pr}$ to flow through the diode $D_2$. During this mode, the snubber capacitor $C_1$, connected across the drain and source terminals of the main switch $M_1$, is slowly charged to a value $V_{CR}$, equal to the voltage across the resonant capacitor $C_R$, as shown in FIG. 2I, thus limiting the voltage stress associated with the turn off of the main switch $M_1$.

While the voltage across the primary winding is greater than zero, the saturable reactor $SR_3$ conducts thereby biasing the rectifier diode $D_3$ causing current to flow from the secondary winding through the saturable reactor $SR_3$, diode $D_3$, inductor L through the load and back to the secondary winding. Once the voltage across the primary winding drops below zero, the freewheeling diode $D_5$ causes electrical current to circulate through the diode $D_5$, inductor L load and back through the diode $D_5$. The current is diverted from $D_3$ to $D_5$ (the rate of diverting is determined by the secondary leakage). As the current $i_{D3}$ in the diode $D_3$ approaches zero, the saturable reactor $SR_3$ regains its high impedance, eliminating reverse recovery losses for the diode $D_3$ as indicated in FIG. 2F. Since the saturable reactor $SR_4$ is still blocking, $SR_3$ sees no voltage during the transition. Hence, it is soft switched. So is the diode $D_3$.

Figure 3C:
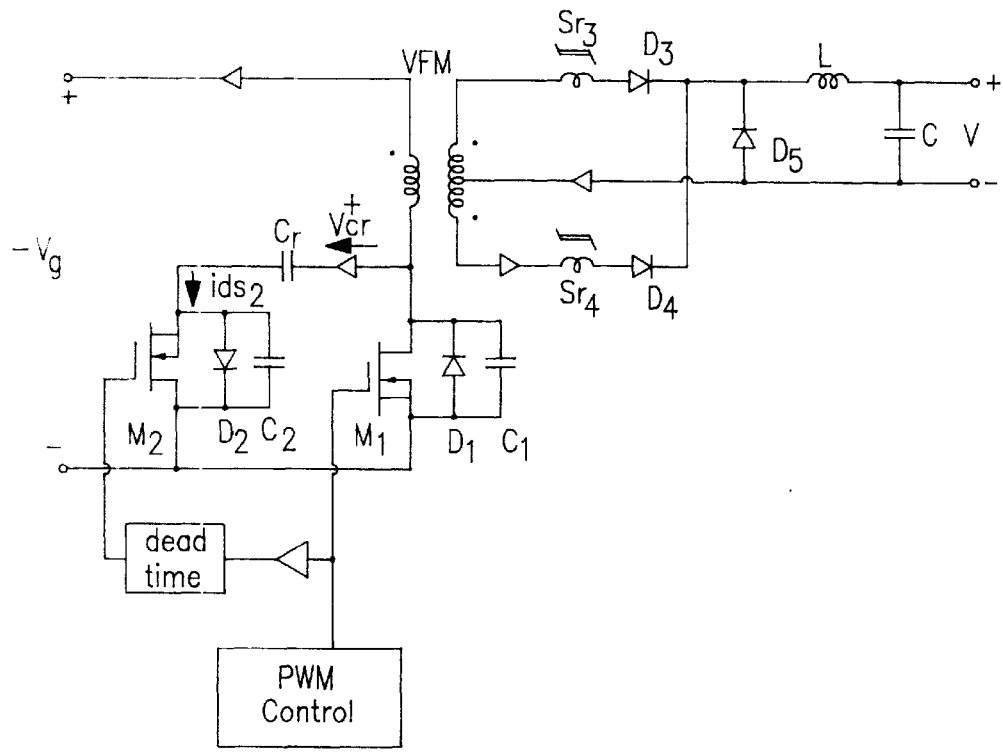

Once the auxiliary switch $M_2$ turns on, the bipolar magnetizing current $i_{mg}$ through the transformer winding swings from a maximum peak to a flat negative peak. While the magnetizing current $i_{mg}$ is positive, the DC converter circuit 20 operates in a "flyback" mode as illustrated in FIG. 3C. Once the magnetizing current $i_{mg}$ goes from a positive value to a negative value while, the auxiliary switch $M_2$ is closed. When the magnetizing current goes negative, the circuit operates in a forward mode as indicated in FIG. 3D.

Referring back to FIG. 3C, in the "flyback" mode, the magnetizing current $i_{mg}$ is circulated from the positive rail of the DC voltage source through the primary winding, resonant capacitor $C_R$, diode $D_2$, drain and source terminals of the auxiliary switch $M_2$ and back to the negative rail of the DC voltage source. The auxillary switch $M_2$ is turned on while the diode $D_2$ is conducting, realizing zero-voltage switching of the auxiliary switch $M_2$. Since the voltage $V_{pr}$ across the primary winding is negative during this period, the saturable reactor $SR_3$ blocks while the saturable reactor $SR_4$ conducts. During such a condition the diode $D_4$ is forward biased allowing electrical current to flow from the secondary winding through the saturable reactor $SR_4$, diode $D_4$, the inductor L through the load and back to the secondary winding. Note that the energy provided to the load is from the transformer. This is similar to a flyback converter. However, the voltage across the transformer, $V_{pr}$, is not determined by the output voltage as in a flyback converter. Rather, the voltage $V_{pr}$ is determined by the voltage across the resonant capacitor $V_{CR}$, which is similar to a forward converter. To indicate this difference, flyback is in quotation marks. Note also that, since the current mirror is abandoned, the duration of this "flyback" mode is much shorter than those in prior art. This is needed to prevent the locked-up mode from onsetting.

Figure 3D:
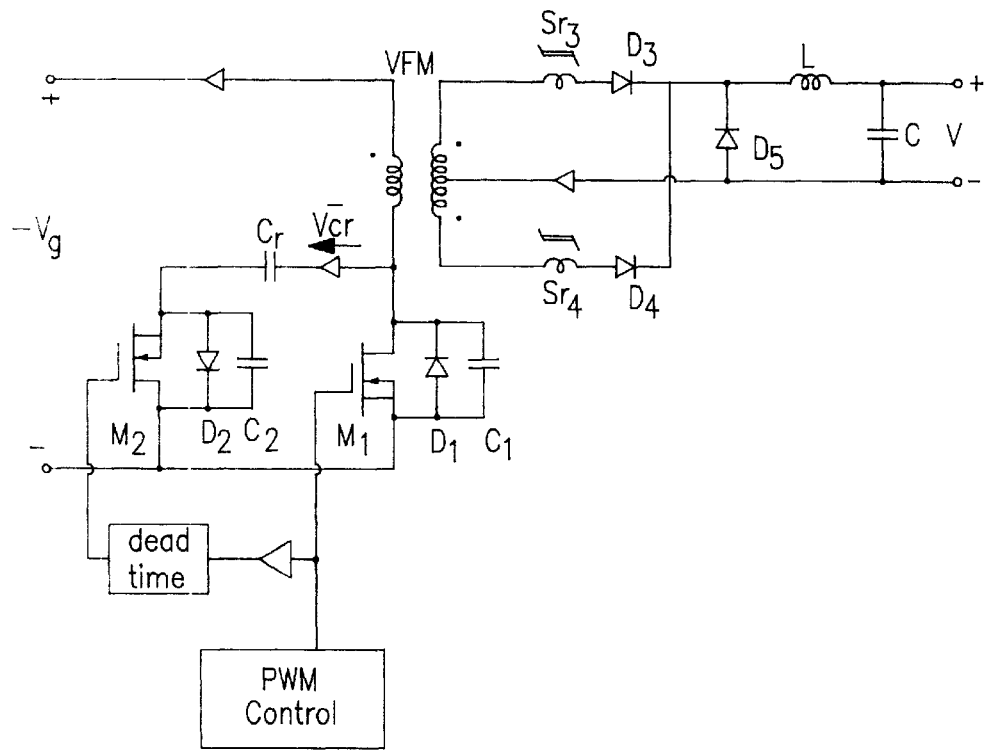

Once the magnetizing current $i_{mg}$ goes negative, the DC—DC converter circuit 20 operates in a forward mode as illustrated in FIG. 3D causing the magnetizing current $i_{mg}$ to circulate from the negative rail of the DC voltage source through the auxiliary switch $M_2$, resonant capacitor $C_R$ through the primary winding and back to the positive rail of the DC voltage source. Since the voltage across the primary winding is negative during this condition, the saturable reactor $SR_3$ blocks while the saturable reactor $SR_4$ conducts causing current to circulate through the saturable reactor $SR_4$, diode $D_4$ through the inductor L through the load and back to the secondary winding. Note that the energy provided to load is from the resonant capacitor, $C_R$. This energy transfer mechanism is similar to a forward converter.

During the "flyback"/forward interval, the voltage presented to the low pass filter is a second voltage pulse, as indicated in FIG. 2M during a switching cycle of the main switch $M_1$. The amplitude of the pulse is given by $(V_g-V_{CR})/n$. This is a significant departure from the conventional forward converter. (In a conventional forward converter, there is only one voltage pulse presented to the low-pass filter). Therefore, the present invention can be called appropriately a double forward converter. Indeed, straightforward analysis yields the voltage conversion ratio is given by $$M \triangleq \frac{V}{V_g} = \frac{2d}{n},$$

which is exactly twice of the value for a forward converter where $$M = \frac{d}{n}.$$

The feature of double forwarding has demonstrated its ability to improve efficiency anywhere between 2–10%, depending on applications. This gain of efficiency is obtained by realizing a maximum duty ratio close to one, compared to 50% in a conventional forward converter.

Figure 3E:
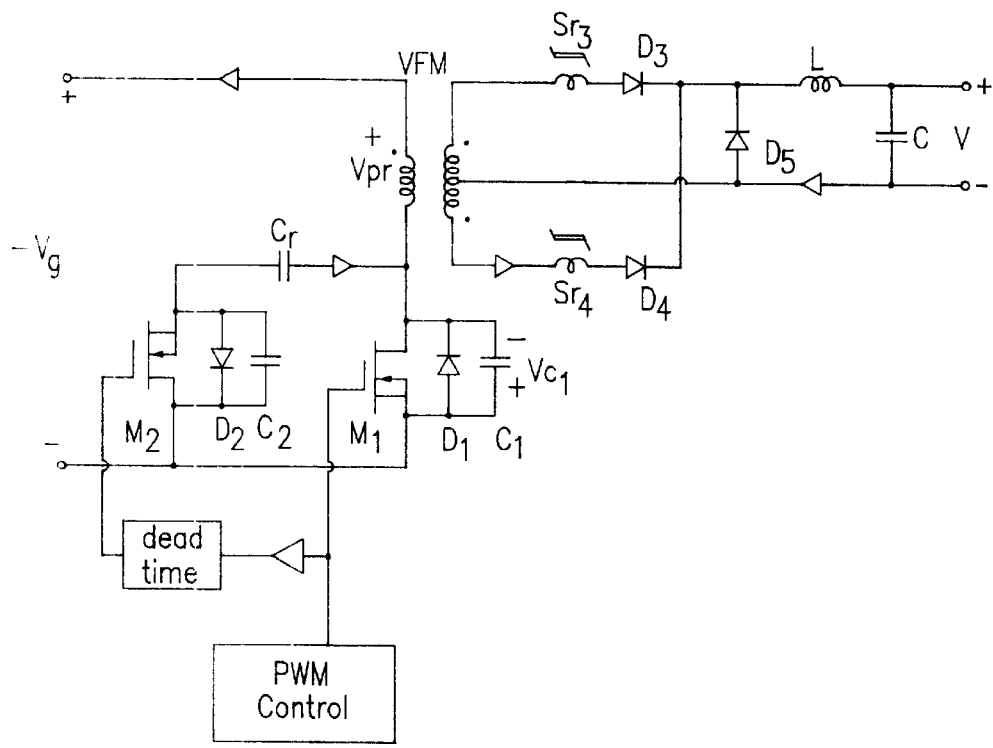

After the auxiliary switch $M_2$ is turned off, the DC—DC converter circuit 20 enters second transition mode as illustrated in FIG. 3E. As discussed above, a deadtime exists between the turn-off of the auxiliary switch $M_2$ and the turn-on of the main switch $M_1$. As shown in FIG. 2C, during this deadtime, the voltage on the primary winding $V_{pr}$ ramps up linearly to a positive value equal to the source voltage $V_g$. Immediately after the auxiliary switch $M_2$ is turned off, electrical current continues to flow from the negative rail of the DC voltage source through the auxiliary switch $M_2$, resonant capacitor $C_R$ through the primary winding and back to the positive rail of the DC voltage source. Electrical current also flows from the negative rail of the DC voltage source through the snubber capacitor $C_1$, thereby discharging the snubber capacitor $C_1$ to allow the diode $D_1$ to turn on, which, in turn, enables the main switch $M_1$ to be turned on at zero voltage during the next cycle. Once the auxiliary switch $M_2$ is turned off, the snubber $C_2$ limits the voltage across the auxiliary switch $M_2$ to a voltage $V_{CR}$ the voltage across the resonant capacitor $C_R$. Note that the negative current in the main switch $M_1$ needs to be designed to be small. Hence, no significant penalty in added conduction loss is incurred. A small negative current is also consistent with the avoidance of the locked-up mode.

After the auxiliary switch $M_2$ is turned off, the saturable reactor $SR_4$ conducts, forward biasing the diode $D_4$ to enable it conduct when the primary voltage $V_{pr}$ is less than zero. Once the primary voltage $V_{pr}$ rises above zero, the freewheeling diode $D_5$ begins conducting to enable current to circulate through the inductor L through the load and back through the freewheeling diode $D_5$ while the saturable reactor $SR_3$ is in an blocking mode thereby providing a soft transition of the rectifier diode $D_4$ eliminating reverse recovery losses for the diode $D_4$. The transition of load current from $D_4$ to $D_5$ incurs no switching loss, since the saturable reactor $SR_3$ is blocking.

Note also that during two time durations for soft transitions, the freewheeling diode $D_5$ limits the load current to the secondary side of the converter. This feature not only allows the primary transition to proceed orderly, but also limits the circulating energy to a minimum (hence, improved efficiency).

Another significant improvement of the present invention is its ability to avoid the undesirable locked-up mode. There is no additional circuitry needed. Proper design of the primary parameters allows the circuit to operate in a different mode as indicated in FIG. 2L. The current waveform is no longer symmetrical and the current mirror is abandoned. More time is allowed for the resonant capacitor to reset. Hence, this circuit is tolerable of transient conditions, free of the possibility of being locked up. Consequently, the reliability of the converter is greatly improved.

Figure 4:
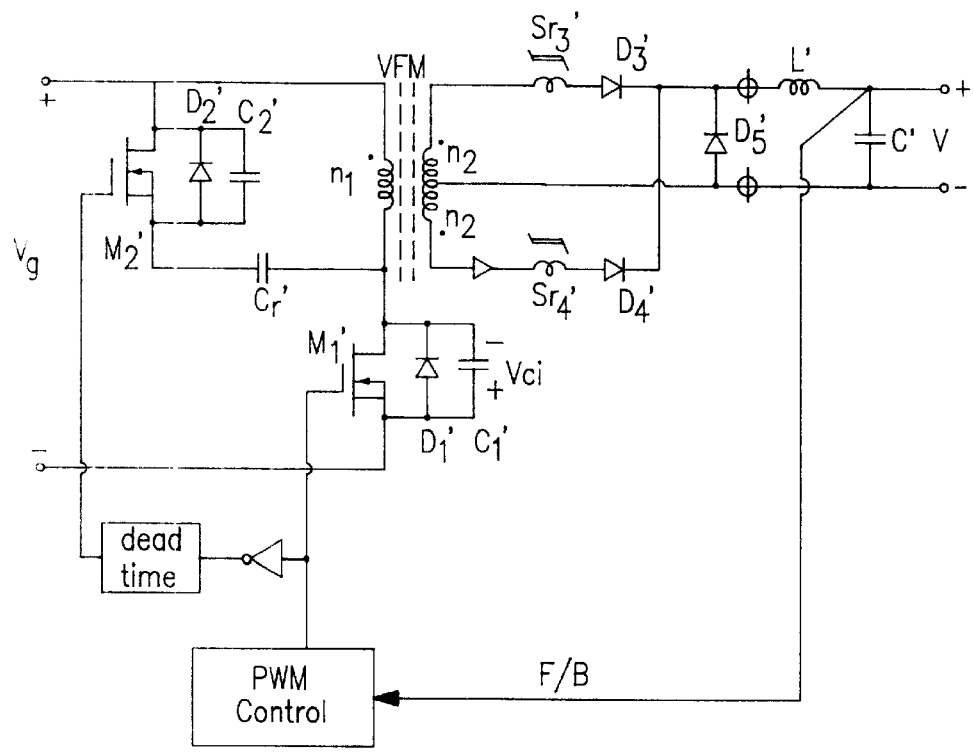
FIG. 4 is the schematic diagram of an alternative implementation of the present invention, where the magnetizing current of the XFRM is steered away from the input or voltage source. Hence, the recycled energy is reduced.
Figure 5:
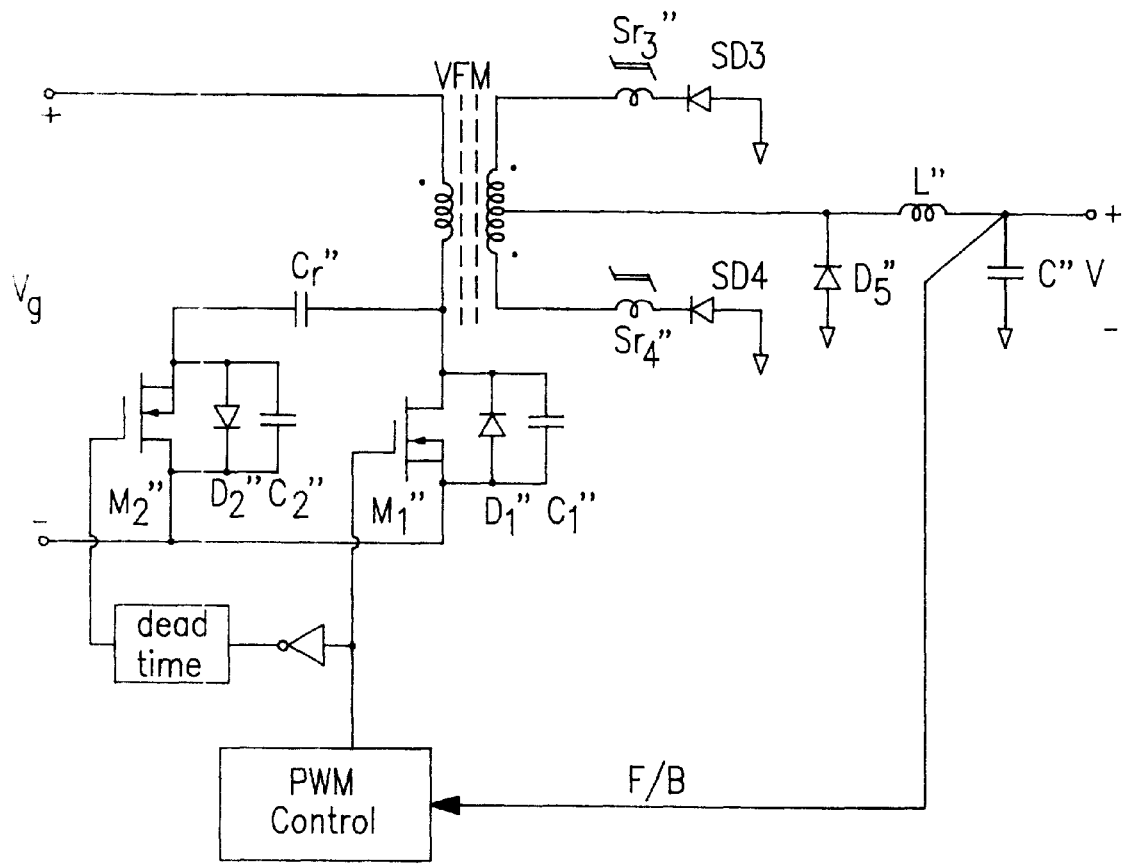
FIG. 5 is the schematic diagram of yet another alternative implementation of the present invention, particularly suitable for applications where synchronous rectifiers are preferred over conventional rectifier diodes.
Figure 6:
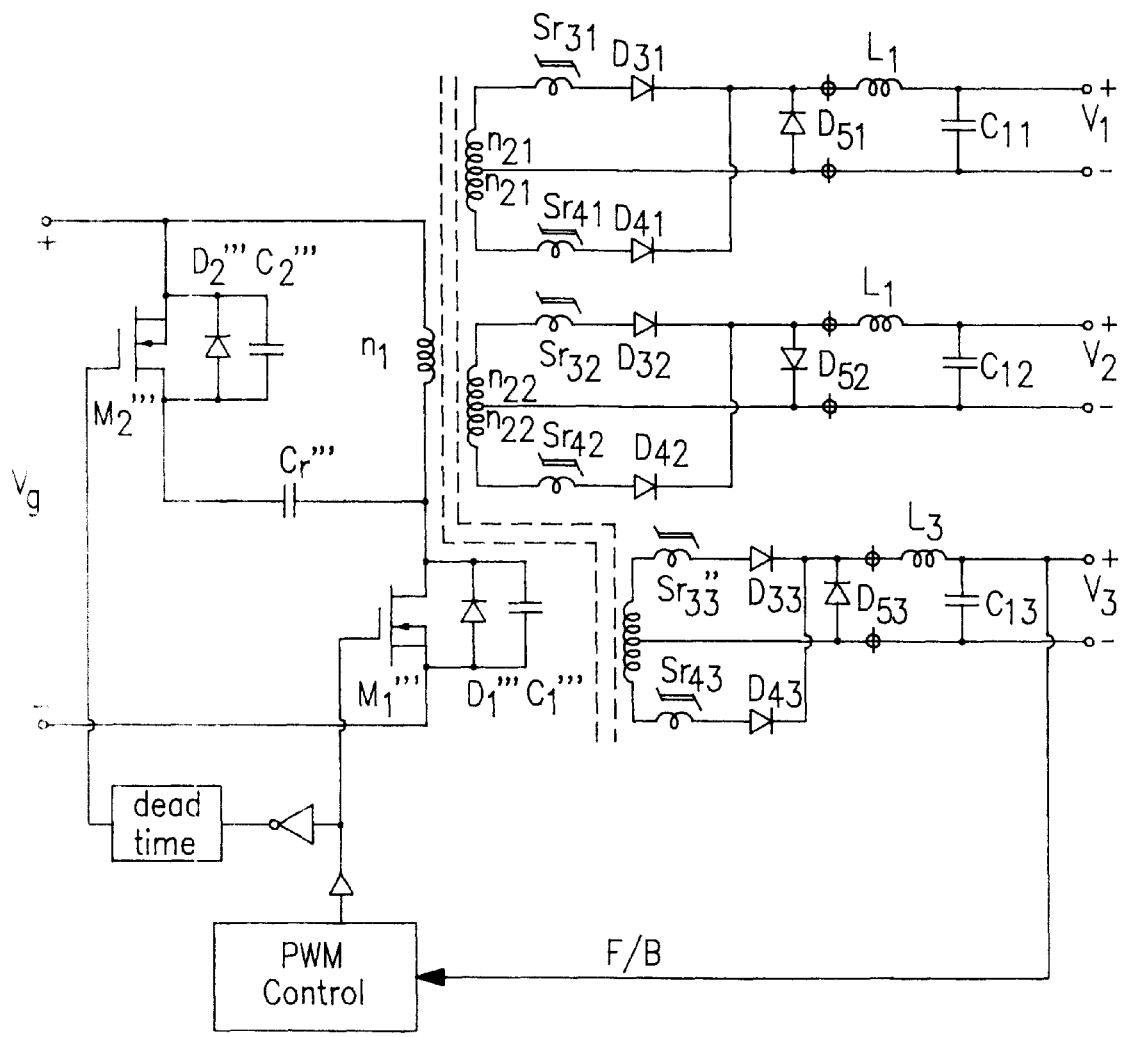
FIG. 6 is the schematic diagram of the present invention for applications where multiple output voltage are needed.

Alternate embodiments of the invention are illustrated in FIGS. 4, 5 and 6. For simplicity, like components are identified with like reference numbers. Primes, double primes etc. are used to distinguish between the various embodiments. All three embodiments operate in a manner similar to the embodiment illustrated in FIG. 1.

All three embodiments incorporate feedback from the output terminal of the converter to the PWM control circuit. Other distinctions between each of the embodiments relative to FIG. 1 are discussed below.

FIG. 4 is similar to FIG. 1, except for the location of the auxiliary switch $M_2$. In this embodiment, the auxiliary switch $M_2$ is connected across the primary winding $n_1$ of the transformer XFRM. More specifically, the auxiliary switch $M_2$ is implemented as a MOSFET having gate, drain and source terminals. The drain and source terminals are electrically coupled across the primary winding. A resonant capacitor $C_R$ prime is coupled between the auxiliary switch $M_1$ and the auxiliary switch $M_2$.

FIG. 5 represents another alternate embodiment of the present invention. This embodiments is particularly suitable for applications were synchronous rectifiers are preferred over conventional rectifier diodes. This embodiment is also similar to the embodiment illustrated in FIG. 1 except that the rectifier diodes $D_3$ and $D_4$ are substituted with synchronous rectifiers $SD_3$ and $SD_4$.

FIG. 6 is another alternate embodiment of the invention which provides for multiple outputs. In this embodiment, the transformer XFRM is provided with a plurality of independent secondary windings. For example, 3 independent secondary windings are illustrated in FIG. 6. As shown, each independent set of secondary windings includes two windings as in FIG. 1. The circuitry otherwise is similar to the embodiment illustrated in FIG. 1.

Obviously many modifications and variations of the present invention are possible in light of the above teachings. Thus, it is to be understood that, within the scope of the appended claims, the invention may be practiced otherwise than as specifically described above.

I claim:

1. A DC-to-DC converter circuit comprising:

a transformer having a primary winding and a plurality of secondary windings, said primary winding adapted to be coupled to a DC voltage source;

a main switch serially coupled to said primary winding defining a node and electrically coupled to said DC voltage source, said main switch adapted to be controlled by a pulse width modulator circuit;

a pair of input terminals electrically coupled to said primary winding and said main switch;

a reset circuit electrically coupled to said primary winding and said DC voltage source for automatically returning magnetizing current to said DC voltage source when said main switch is turned off, said reset circuit including a first capacitor and an auxiliary switch, said auxiliary switch coupled across the main switch, said capacitor connected to said node and used to control said auxiliary switch;

a first diode connected in parallel across said main switch;

a second capacitor connected in parallel with said first diode;

a second diode electrically coupled across said auxiliary switch and said first capacitor;

a third diode, electrically coupled to one of said plurality of secondary windings;

a first saturable reactor, serially coupled to said third diode;

a fourth diode, electrically coupled to the other another of said plurality of secondary windings;

a second saturable reactor, serially coupled to said second rectifier diode;

a freewheeling fifth diode, electrically coupled between said third and fourth diode; and a pair of output terminals defined across said freewheeling fifth diode.

2. The DC-to-DC converter circuit as recited in claim 1, wherein said main switch is a solid state switch.

3. The DC-to-DC converter circuit as recited in claim 2, wherein said solid state switch is a MOSFET having gate, drain and source terminals.

4. The DC-to-DC converter circuit as recited in claim 1, wherein said auxiliary switch is implemented as a MOSFET having gate, drain and source terminals.

5. The DC-to-DC converter circuit as recited in claim 1, further including a filter circuit which includes an inductor and a capacitor.

6. The DC-to-DC converter circuit as recited in claim 1, wherein said plurality of secondary windings have equal turns.

7. A DC-to-DC converter circuit comprising;

a transformer having a primary winding and a plurality of secondary windings, said primary winding adapted to be electrically coupled to a DC voltage source;

a main switch electrically coupled to said DC voltage source and serially coupled to said primary winding defining a node, said main switch for controlling the energy transfer from said DC voltage source and said transformer;

a first diode coupled in parallel across main switch;

a first capacitor coupled in parallel across said first diode and said main switch;

a pair of input terminals electrically coupled to said primary winding and said main switch;

a pulse width modulator circuit for controlling said main switch;

an auxiliary switch electrically coupled across said main switch;

a second capacitor electrically coupled across said auxiliary switch;

a second diode electrically coupled across said second capacitor and said auxiliary switch;

a third capacitor coupled to said node and used for automatically discharging the energy in said transformer when said main switch is turned off;

third and fourth diodes electrically coupled to said plurality of secondary windings;

a first saturable reactor, serially coupled to said third diode;

a second saturable reactor, serially coupled to said fourth diode; and a freewheeling fifth diode, electrically coupled to said third and fourth diodes which conducts when the main and auxiliary switches are turned off to prevent reverse recovery losses of said third and fourth diodes; and a pair of output terminals electrically coupled across said freewheeling fifth diode.

8. The DC-to-DC converter circuit as recited in claim 7, further including a filter circuit electrically coupled to said pair of output terminals.

9. The DC-to-DC converter circuit as recited in claim 8, wherein said filter circuit includes a capacitor and an inductor.

10. DC-to-DC converter circuit as recited in claim 7, wherein said main and auxiliary switches are MOSFETS and said first and second diodes are body diodes of said MOSFETS.

11. A DC-to-DC converter circuit comprising;

a transformer having a primary winding and a plurality of secondary windings, said primary winding adapted to be coupled to a DC voltage source;

a main switch serially coupled to said primary winding defining a node and electrically coupled to said DC voltage source, said main switch adapted to be controlled by a pulse width modulator circuit; and a reset circuit electrically coupled to said primary winding and said DC voltage source for automatically returning magnetizing current to said DC voltage source when said main switch is turned off, said reset circuit including an auxiliary switch electrically coupled across said main switch, said reset circuit including a capacitor connected to said node and used to control said auxiliary switch;

a first rectifier diode, electrically coupled to one of said plurality of secondary windings;

a first saturable reactor, serially coupled to said first rectifier diode;

a second rectifier diode, electrically coupled to another of said plurality of secondary windings;

a second saturable reactor serially coupled to said second rectifier diode;

a freewheeling diode electrically coupled between first and second rectifier diodes which conducts when the main and auxiliary switches are turned off to prevent reverse discovery losses of said first and second rectifier diodes; and a pair of output terminals electrically, coupled to said freewheeling diode.

12. A DC-to-DC converter circuit comprising:

a transformer having a primary winding and a plurality of secondary windings, said primary winding adapted to be coupled to a DC voltage source;

a main switch electrically coupled to said primary winding and said DC voltage source, said main switch adapted to be controlled by a pulse width modulator circuit;

a reset circuit electrically coupled to said primary winding and said DC voltage source for automatically returning magnetizing current to said DC voltage source when said main switch is turned off;

a first synchronous rectifier electrically coupled to one of said plurality of secondary windings;

a first saturable reactors, serially coupled to said first rectifier diodes;

a second synchronous rectifier electrically coupled to another of said plurality of secondary windings;

a second saturable reactor serially coupled to said second rectifier diode;

a freewheeling diode electrically coupled between said first and second rectifier diode; and a pair of output terminals electrically coupled to said secondary winding.

13. A DC-to-DC converter circuit comprising:

a transformer having a primary winding and multiple independent secondary windings, said primary winding adapted to be coupled to a DC voltage source;

a main switch electrically coupled to said primary winding and said DC voltage source, said main switch adapted to be controlled by a pulse width modulator circuit;

a reset circuit electrically coupled to said primary winding and said DC voltage source for automatically returning magnetizing current to said DC voltage source when said main switch is turned off;

first and second rectifier diodes electrically coupled to each of said multiple independent secondary windings;

first saturable reactors, serially coupled to each of said first rectifier diodes;

second saturable reactors, serially coupled to each of said second rectifier diodes;

freewheeling diodes electrically coupled between said first and second rectifier diode; and output terminals electrically coupled to each of said secondary windings.

14. A double forward DC-to-DC converter comprising:

a transformer having a primary winding and a plurality of secondary windings adapted to being connected to a source of DC voltage;

a main switch serially coupled to said primary winding defining a node and electrically coupled to said source of DC voltage, said main adapted switch to be controlled by a pulse width modulator circuit, each on and off cycle of said main switch defining a switching cycle;

a reset circuit electrically coupled to said primary winding for automatically returning magnetizing current to said voltage source each time said main switch is turned off, said reset circuit including a capacitor and an auxiliary switch, said auxiliary switch coupled across said main switch, said capacitor connected to said node and used to control said auxiliary switch;

means for providing at least two pulses to said output terminals during each switching cycle; and a pair of output terminals electrically coupled to said secondary windings.

15. A DC-to DC- converter circuit comprising;

a transformer having a primary winding and predetermined secondary windings, said primary winding adapted to be coupled to a DC voltage source;

a main switch serially coupled to said primary winding defining a node and electrically coupled to said DC voltage source, said main switch adapted to be controlled by a pulse width modulator circuit, each on and off cycle defining a switching cycle;

a reset circuit electrically coupled to said primary winding and said DC voltage source for automatically returning magnetizing current to said DC voltage source when said main switch is turned off, said reset circuit including a capacitor and an auxiliary switch, said auxiliary switch coupled across said main switch, said capacitor connected to said node and used to control said auxiliary switch;

a first rectifier device electrically coupled to said secondary windings;

a first saturable reactor, serially coupled to said first rectifier device;

a second rectifier device electrically coupled to said secondary windings;

a freewheeling diode electrically coupled between said first and second rectifier devices; and output terminals electrically coupled to said freewheeling diode.

16. The DC-to-DC converter as recited in claim 15, wherein said first and second rectifier devices are synchronous rectifiers.

17. The DC-to-DC converter as recited in claim 15, wherein said first and second rectifier devices are rectifier diodes.

18. The DC-to-DC converter as recited in claim 15, wherein said predetermined secondary windings.

19. The DC-to-DC converter as recited in claim 15, wherein said reset circuit includes means for providing a plurality of pulses to said output terminals every switching cycle.

* * * * *